Nov. 17, 1931.   J. C. BECKFIELD   1,832,614
APPARATUS FOR LUBRICATING ROTARY BLOWERS
Filed March 11, 1927   3 Sheets-Sheet 1

John C. Beckfield
INVENTOR
BY John H. Rowey
his ATTORNEY

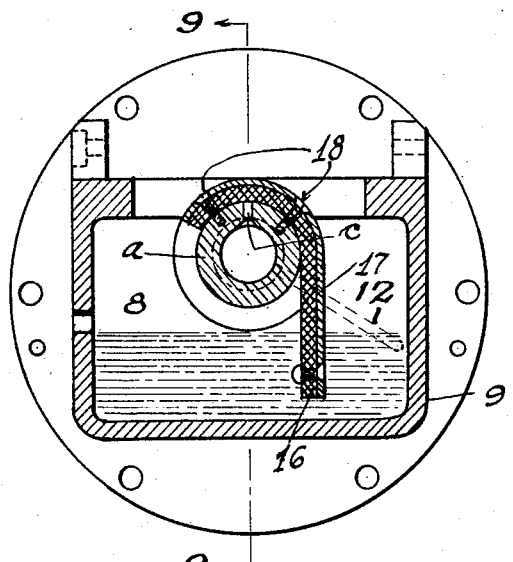
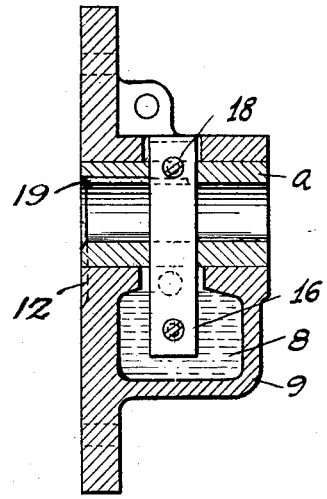
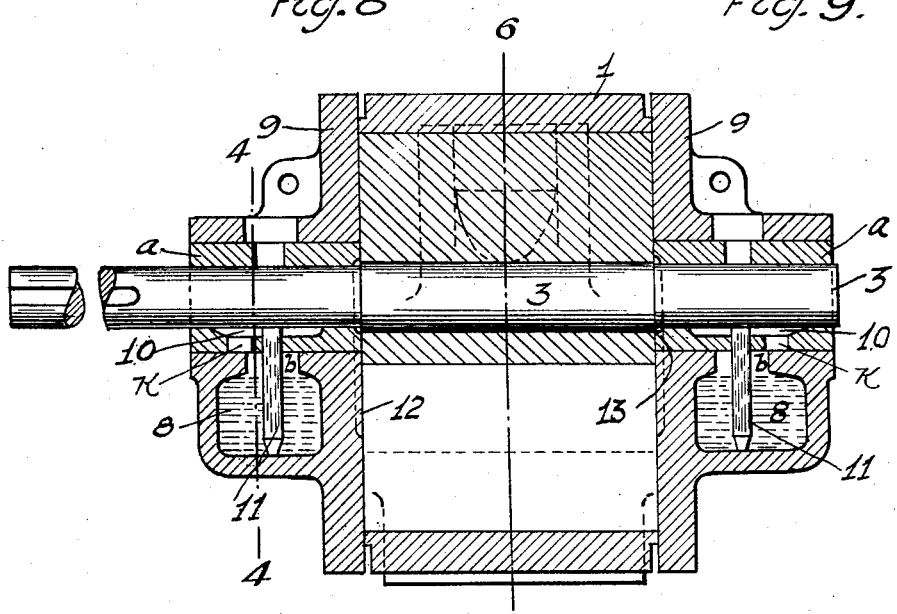

Nov. 17, 1931. J. C. BECKFIELD 1,832,614
APPARATUS FOR LUBRICATING ROTARY BLOWERS
Filed March 11, 1927 3 Sheets-Sheet 3

John C. Beckfield
INVENTOR
BY John H. Roney
his ATTORNEY

Patented Nov. 17, 1931

1,832,614

UNITED STATES PATENT OFFICE

JOHN C. BECKFIELD, OF PITTSBURGH, PENNSYLVANIA

APPARATUS FOR LUBRICATING ROTARY BLOWERS

Application filed March 11, 1927. Serial No. 174,479.

The object of my invention is the improvement in means for lubricating rotary blowers whereby oil is distributed to the bearings of the blower and all working parts.

For such purpose I have provided the structure hereinafter described and claimed.

In the accompanying drawings, wherein I have illustrated a practical embodiment of the principles of my present invention, Fig. 1 is a side elevation of a rotary blower to which my invention is applied.

Fig. 3 is a longitudinal section of the blower taken along the line 3—3 in Fig. 6.

Fig. 8 is a section taken along the same line as is Fig. 4 but showing a modification.

Fig. 9 is a section taken along the line 9—9 in Fig. 8.

Figure 1:
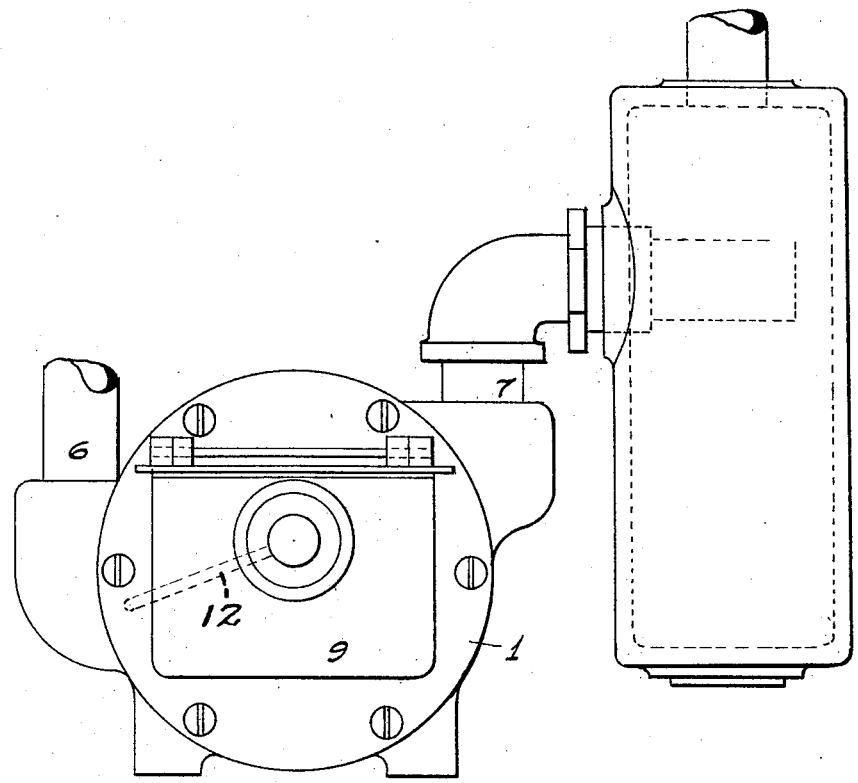
Figure 2:
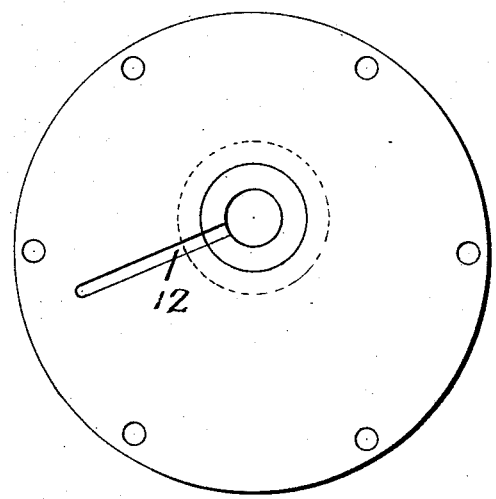
Fig. 2 is an inside face view of one of the heads of the blower casing.
Figure 4:
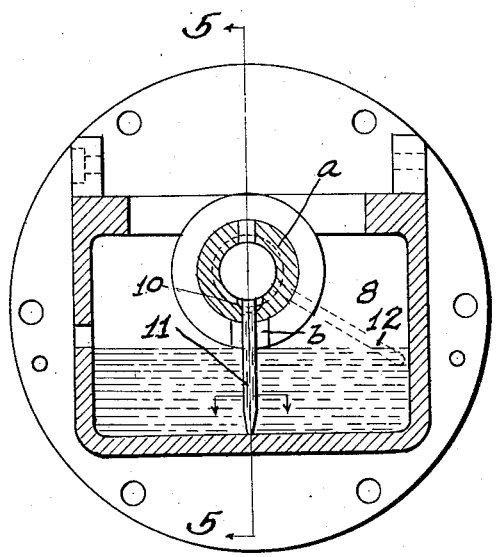
Fig. 4 is a sectional view taken along the line 4—4 in Fig. 3.
Figure 5:
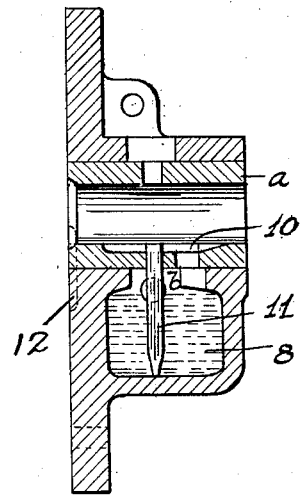
Fig. 5 is a sectional view taken along the line 5—5 in Fig. 4.
Figure 6:
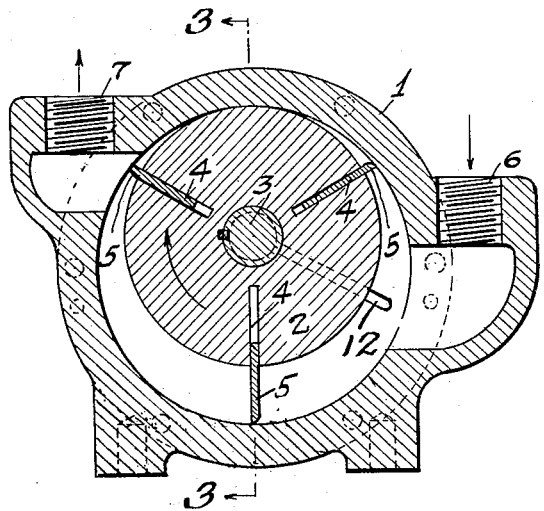
Fig. 6 is a sectional view taken along the line 6—6 in Fig. 3.
Figure 7:
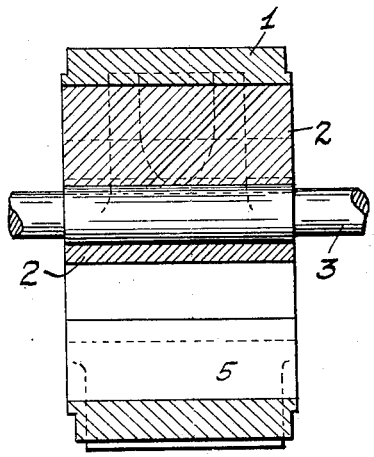
Fig. 7 is a similar view to Fig. 3 but with the heads removed.
Figure 10:
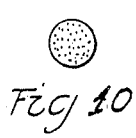

Referring first to Figs. 1 to 7, inclusive, 1 represents the casing of a rotary blower in which is contained the rotor 2 mounted on a shaft 3 whose ends are journaled in the bushings $a$. The rotor is provided with the usual radially disposed slots 4 in which are slidably mounted the vanes 5. The rotation of the rotor causes air to be drawn into the casing through the connection 6 and to be discharged through the connection 7.

The ends of the casing 1 are closed by the heads 9 in the bores of which are mounted the bushings $a$. The heads below the bushings are provided with oil chambers 8 in which supplies of lubricant are contained.

The lower walls of the bores of the bushings $a$ are provided with elongated grooves 10 in which oil collects. The oil is fed to the journals of the shaft 3 by means of the rigid porous lubricator conveyers 11 which are formed of lengths of rattan rod or similar material and which are stepped in the chambers 8 and extend up through ports $b$ in the top walls of the latter into the grooves 10 and have their upper ends in contact with the shaft 3.

The oil is thus fed by capillary attraction and supplied to the perimetral surfaces of the shaft, the excess oil collecting in the grooves 10. The grooves 10 may communicate with restricted ports $k$ to permit an oversupply of lubricant to drain back into the chambers 8.

The heads 9 are provided with passages 12 which lead from annular enlargements 13 formed at the inner ends of the bores of the bushings $a$. These passages which may be, as shown, grooves cut in the inner surfaces of the head extend to the low pressure or vacuum area of the casing which in the drawings is located at the bottom.

Thus the lubricant travels from the grooves 10 inwardly along the shaft 3 to the annular enlargements 13 and then by means of the passages 12 to the area of low pressure.

Suction therefore operates on the oil in grooves 10 drawing it inwardly along the working parts and this suction is of course controlled by the degree of vacuum or low pressure which can be regulated by known means.

By regulating the cross-sectional area of the lubricant conveyer 11 the supply of oil withdrawn from the chamber 8 may be controlled and adjusted.

In Figs. 8 and 9 I show a non-rigid type of feed element comprising a strip of felt 16 which is secured to a ribbon or strip 17 of sheet metal such as brass as by rivets 18. The lower end of the felt depends into the chamber 8 and is immersed in the oil supply while its upper end is curved up over the bushing $a$ and extends across a port $c$ in the upper side of the bushing, thus feeding oil upwardly from the chamber 8 and causing it to drop down through the port $c$ onto the journal of the shaft 3. The port $c$ communicates with a groove 19 in the inner top wall of the bushing $a$ which extends inwardly to the end of the bushing and communicates with the annular enlargement 13 at the inner end of the bushing.

It is thus evident that there is a direct and uninterrupted communication between the lubricant conveyer and the suction or low pressure area of the blower, thus causing the excess oil from the bearings to be drawn into the interior of the blower to lubricate the latter.

I claim:

1. In a rotary blower, in combination, a shaft, opposed head members, each formed with a bearing, a bushing fitted in each bearing and receiving the adjacent end of said shaft, a lubricant container carried by each head member and arranged beneath the adjacent bushing, a rigid feeding element depending from each bushing into the adjacent lubricant container for lubricating said shaft, each bushing being formed with a longitudinally disposed recess to receive the excess lubricant, and each of said head members being provided on its inner face with a groove to receive the lubricant from the adjacent recess by virtue of a vacuum produced incident to the rotation of said shaft.

2. In a rotary blower, the combination of a rotor-casing, a shaft in said casing, a rotor mounted on said shaft, a bearing for said shaft, a lubricant reservoir, means for supplying lubricant from said reservoir to said bearing, and said bearing being provided with a recess to receive excess lubricant supplied to the bearing, said recess having communication with the interior of the casing whereby the low pressure produced in the casing by the movement of the rotor causes the lubricant to travel inwardly along the shaft from the recess into the interior of the casing.

3. In a rotary blower, the combination of a rotor-casing, a shaft in said casing, a rotor mounted on said shaft, a bearing for said shaft, a lubricant reservoir, means for supplying a measured quantity of lubricant from said reservoir to said bearing, and said bearing being provided with a recess to receive excess lubricant supplied to the bearing, said recess having communication with the interior of the casing whereby the low pressure produced in the casing by the movement of the rotor causes the lubricant to travel inwardly along the shaft from the recess into the interior of the casing.

4. In a rotary blower, the combination of a rotor-casing, a shaft in said casing, a rotor mounted on said shaft, a bearing for said shaft, a lubricant reservoir below the bearing, a rigid feeding element partially immersed in the lubricant in said reservoir and arranged to deliver lubricant to the interior of the bearing, said bearing being provided with a recess to receive the excess lubricant delivered to the bearing, and said recess being in communication with the interior of the casing whereby the low pressure in the casing produced by the movement of the rotor causes the lubricant to travel inwardly along the shaft from said recess into the interior of the casing.

5. In a rotary blower, the combination of a rotor-casing, a shaft in said casing, a rotor mounted on said shaft, a bearing for said shaft, a lubricant reservoir below the bearing, a rigid feeding element partially immersed in the lubricant in said reservoir and arranged to deliver a measured quantity of lubricant to the interior of the bearing, said bearing being provided with a recess to receive the excess lubricant delivered to the bearing, and said recess being in communication with the interior of the casing whereby the low pressure in the casing produced by the movement of the rotor causes the lubricant to travel inwardly along the shaft from said recess into the interior of the casing.

6. In a rotary blower, the combination of a rotor-casing, a shaft in said casing, a rotor mounted on said shaft, a bearing for the end of the shaft, a lubricant reservoir, means for supplying lubricant from said reservoir to said bearing, a recess being provided between the bearing and the shaft in which excess lubricant is collected and a constant open connection between said recess and the low pressure area in the interior of the casing whereby the movement of the rotor causes lubricant to be drawn into the interior of the casing from said recess.

7. In a rotary blower, the combination of a rotor-casing, a shaft in said casing, a rotor mounted on said shaft, a bearing for the end of said shaft, a recess being provided between the bearing and the shaft for the collection of excess lubricant, said recess being in communication with the low pressure area of the interior of the casing, a flexible capillary lubricant conveyer having its lower end immersed in lubricant and extending up over the bearing, and a passage through the wall of the bearing having its upper end covered by said conveyer and having its lower end in communication with said recess.

8. In a rotary blower, the combination of a rotor-casing, a shaft in said casing, a rotor mounted on said shaft, a bearing for the end of said shaft, a recess being provided between the bearing and the shaft for the collection of excess lubricant, said recess being in communication with the low pressure area of the interior of the casing, a flexible capillary lubricant conveyer having its lower end immersed in lubricant and extending up over the bearing, a passage through the wall of the bearing having its upper end covered by said conveyer and having its lower end in communication with said recess, and a rigid support for said conveyer to maintain the latter in position.

9. In a rotary blower, the combination of a rotor-casing, a shaft in said casing, a rotor mounted on said shaft, a bearing for the end of said shaft, a recess being provided between the bearing and the shaft for the collection of excess lubricant, said recess being in communication with the low pressure area of the interior of the casing, a flexible capillary lubricant conveyer having its lower end immersed in lubricant and extending up over the bearing, a passage through the wall of the bearing having its upper end covered by said conveyer and having its lower end in communication with said recess, and a strip of stiffening material secured to one face of said conveyer to maintain the latter in position.

In testimony whereof, I have hereunto signed my name.

JOHN C. BECKFIELD.